US008776209B1

(12) United States Patent
Kumar et al.

(10) Patent No.: US 8,776,209 B1
(45) Date of Patent: Jul. 8, 2014

(54) TUNNELING SESSION DETECTION TO PROVIDE SINGLE-SIGN ON (SSO) FUNCTIONALITY FOR A VPN GATEWAY

(75) Inventors: Kartik Kumar, Bangalore (IN); Ankur Agrawal, Bangalore (IN); Roger A. Chickering, Granite Bay, CA (US); James Wood, Gilroy, CA (US); Vamsi K. Anne, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 13/416,786

(22) Filed: Mar. 9, 2012

(51) Int. Cl.
*H04L 29/06* (2006.01)
*G06F 21/00* (2013.01)

(52) U.S. Cl.
USPC ............... 726/12; 726/1; 726/15; 709/225; 709/229; 380/270

(58) Field of Classification Search
USPC ............ 726/12, 15, 1; 709/225, 229; 380/270
See application file for complete search history.

(56) References Cited

U.S. PATENT DOCUMENTS

| 8,443,435 | B1* | 5/2013 | Schroeder | 726/15 |
|---|---|---|---|---|
| 2006/0117104 | A1* | 6/2006 | Taniguchi et al. | 709/225 |
| 2011/0153854 | A1* | 6/2011 | Chickering | 709/229 |
| 2012/0002815 | A1* | 1/2012 | Wei et al. | 380/270 |

FOREIGN PATENT DOCUMENTS

JP 2012054729 A * 3/2012

OTHER PUBLICATIONS

Al-Khayatt, S.; Shaikh, S.A.; Akhgar, B.; Siddiqi, J.;"Performance of multimedia applications with IPSec tunneling"; Information Technology: Coding and Computing, 2002. Proceedings. International Conference on Digital Object Identifier: 10.1109/ITCC.2002.1000374; Publication Year: Jan. 2002; pp. 134-138.*
"Assertions and Protocols for the OASIS Security Assertion Markup Language (SAML) V2.0" OASIS Standard, Mar. 15, 2005, available at http://docs.oasis-open.org/security/saml/v2.0/saml-core-2.0-os.pdf, accessed Mar. 9, 2012, 86 pgs.
"Authentication Context for the OASIS Security Assertion Markup Language (SAML) V2.0" OASIS Standard, Mar. 15, 2005, available at http://docs.oasis-open.org/security/saml/v2.0/saml-authn-context-2.0-os.pdf,accessed Mar. 9, 2012, 70 pgs.
"Security Assertion Markup Language (SAML) V2.0 Technical Overview" OASIS Standard, Mar. 25, 2008, available at http://www.oasis-open.org/committees/download.php/27819/sstc-saml-tech-overview-2.0-cd-02.pdf, accessed Mar. 9, 2012, 51 pgs.

(Continued)

*Primary Examiner* — Hadi Armouche
*Assistant Examiner* — Courtney Fields
(74) *Attorney, Agent, or Firm* — Shumaker & Sieffert, P.A.

(57) ABSTRACT

A VPN gateway is described that provides single sign-on (SSO) functionality with respect to remote users who have established tunneling sessions with the VPN gateway and who attempt to access a protected resource. The VPN gateway may receive, from a client device, a security assertion request that includes a request for a security assertion to be made by the VPN gateway with respect to a user of a private network associated with the VPN gateway, determine whether the security assertion request was received via a tunneling session established for the user between the client device and the VPN gateway, and issue a security assertion for the user in response to determining that the security assertion request was received via the tunneling session. In this way, a VPN gateway may act as an SSO identity provider for users that have an established tunneling session with the gateway.

31 Claims, 7 Drawing Sheets

(56) References Cited

OTHER PUBLICATIONS

"Juniper Networks Secure Access Administration Guide, Release 7.0, Revision 2" Juniper Networks, Inc., 2011, 1076 pgs.
"SAML Single Sign-On (SSO) Service for Google Apps" Google Apps—Google Code, available at http://code.google.com/googleapps/domain/sso/saml_reference_implementation.html, accessed Mar. 9, 2012, 3 pgs.
U.S. Appl. No. 11/970,701, filed Jan. 8, 2008 entitled Single Sign-On for Network Applications, 35 pgs.

* cited by examiner

TUNNELING SESSION DETECTION TO PROVIDE SINGLE-SIGN ON (SSO) FUNCTIONALITY FOR A VPN GATEWAY

TECHNICAL FIELD

The invention relates to computer networks, and particularly to security techniques for use in computer networks.

BACKGROUND

Enterprises may use web-based resources and applications to expand the range of software services provided by an enterprise network. For example, an enterprise may use a web-based email and calendar program to provide email and calendar services for the organization. Such web-based resources and applications typically require minimal overhead, if any, in terms of additional hardware, software and/or administration needed, thereby providing time and cost savings to the enterprise in comparison to installing such resources and applications onto a network server or onto individual network devices.

Some service providers that host web-based resources and applications support security assertions which allow an enterprise to use a separate identity provider in order to perform authentication and authorization of enterprise network users who attempt to access the web-based resources. For example, when a user's web browser requests access to a web-based resource, the web-based resource may redirect the browser to an identity provider to verify that the user is properly authenticated and/or authorized to use the internal resource of the enterprise. In response to the redirect, the browser may be required to forward a security assertion request to the identity provider. After the identity provider verifies proper security credentials for the user, the identity provider may formulate a security assertion indicating that user has been properly authenticated and/or is authorized to use the resource, and send the security assertion to the user's browser. The user's browser then forwards the security assertion to the service provider, which upon receiving the security assertion, allows the user to access the protected resource. In this way, an enterprise may allow users to access web-based resources and applications while retaining full control over the authentication and authorization of the enterprise network users accessing the web-based resources.

One example protocol for exchanging authentication and authorization information with an identity provider is the Security Assertion Markup Language (SAML) protocol, which provides an XML-based messaging format. Further details of the SAML protocol can be found in "Assertions and Protocols for the OASIS Security Assertion Markup Language (SAML) V2.0," Organization for the Advancement of Structured Information Standards (OASIS), Mar. 15, 2005; "Authentication Context for the OASIS Security Assertion Markup Language (SAML) V2.0," OASIS, Mar. 15, 2005; and "Security Assertion Markup Language (SAML) V2.0 Technical Overview," OASIS, Mar. 25, 2008; the entire content of each of which is incorporated herein by reference.

Enterprises may use virtual private networks (VPN) to allow employees to securely communicate with enterprise resources over public networks. For example, an enterprise may deploy a VPN gateway to provide secure access to the enterprise resources. The use of a VPN provides assurances that others on the public network cannot intercept, read, or reuse communications sent on the VPN. An employee using a client device at a remote location may establish a secure communication session (i.e., a VPN tunneling session) with the VPN gateway through a public network, such as the Internet. To establishing the tunneling session with the VPN gateway, the user may provide authentication credentials (e.g., a username-password combination) to authenticate with the VPN gateway. Upon authentication of the user, software applications executing on the client device and the VPN gateway may negotiate security parameters (e.g., encryption mechanisms, keys, certificates and like) for the tunneling session.

A VPN handler executing on the client device typically handles establishing and maintaining the secure VPN tunnel. The VPN handler typically either executes as a software application separate from the web browser or resides at a layer of the networking stack which is lower than that of the web browser, thereby being transparent to the web browser. As a result, the user is often required to authenticate multiple times in computing environments requiring security assertions for individual access to web resources. For example, the user typically must first authenticate to the VPN gateway to establish the secure tunneling session for the VPN and then re-authenticate to the identity provider when accessing a SAML-protected web resource.

SUMMARY

In general, techniques are described for using tunneling session detection to allow a VPN gateway to provide single sign-on (SSO) functionality with respect to remote users who have established tunneling sessions with the VPN gateway and who attempt to access a protected resource. For example, a VPN gateway is described that is configured to, as an identity provider, issue security assertions to a service provider for users that have already established a tunneling session with the VPN gateway without requiring such users to re-authenticate. Upon establishing a tunneling session for a particular user on a client device, the VPN gateway may configure the client device to cause security assertion requests directed to the VPN gateway to be sent by the client device to the VPN gateway through the established tunnel. The VPN gateway may detect whether a security assertion request was received through the established tunnel, and issue a security assertion in response to the request without requiring the user to re-authenticate with the VPN gateway when the VPN gateway detects that the security assertion was received through the established tunnel. Receiving a security assertion request through an established tunnel may indicate to the VPN gateway that the user has already successfully authenticated with the VPN gateway. Therefore, according to the techniques described herein, the VPN gateway may safely issue a security assertion for the user without requiring re-authentication. In this way, a VPN gateway may act as a single sign-on (SSO) identity provider for users that have an established tunneling session with the gateway.

The techniques of this disclosure may provide one or more advantages. For example, the techniques of this disclosure may, in some cases, require no additional client-side software components (e.g., browser plug-ins or the like) in order to detect a tunneling session and provide SSO capabilities, even in a computing environment that has Security Assertion Markup Language (SAML)-protected resources. This may reduce the amount and/or complexity of software needed in a client device, which in some cases, may be a device that has relatively limited software resources available (e.g., a mobile phone or a tablet). The techniques of this disclosure may also provide SSO capabilities in both a full-tunneled environment as well as a split-tunneled environment. In addition, the techniques of this disclosure may operate on client devices that utilize domain name system (DNS) caching even if the devices do not support DNS cache cleaning.

In one embodiment, a method includes receiving, with a VPN gateway device, a security assertion request from a client device, the security assertion request including a request for a security assertion to be made by the VPN gateway device with respect to a user of a private network associated with the VPN gateway device. The method further includes determining, with the VPN gateway device, whether the security assertion request was received via a tunneling session established for the user between the client device and the VPN gateway device. The method further includes issuing, with the VPN gateway device, a security assertion for the user in response to determining that the security assertion request was received via the tunneling session.

In another embodiment, a VPN gateway device that includes a processor, and a security assertion module executing on the processor and configured to receive, from a client device, a security assertion request that includes a request for a security assertion to be made by the VPN gateway device with respect to a user of a private network associated with the VPN gateway device. The security assertion module is further configured to determine whether the security assertion request was received via a tunneling session established for the user between the client device and the VPN gateway device. The security assertion module is further configured to issue a security assertion for the user in response to determining that the security assertion request was received via the tunneling session.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
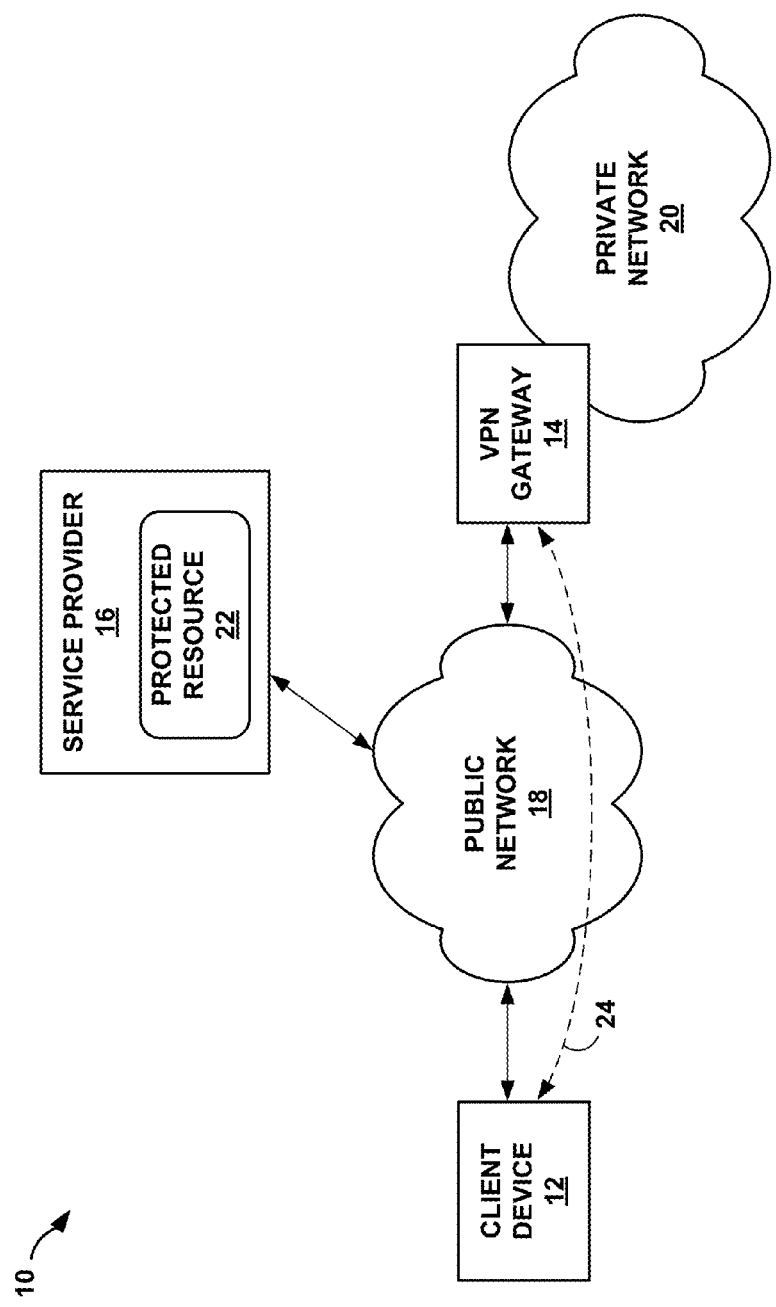
FIG. 1 is a block diagram illustrating an example network environment in which a VPN gateway provides tunnel-based security assertions in accordance with the techniques of this disclosure.

In general, techniques are described for using tunneling session detection to allow a VPN gateway to provide single sign-on (SSO) functionality with respect to remote users who have established tunneling sessions with the VPN gateway and who attempt to access a protected resource. For example, a VPN gateway is described that is configured to, as an identity provider, issue security assertions to a service provider for users that have already established a tunneling session with the VPN gateway without requiring such users to re-authenticate. Upon establishing a tunneling session for a particular user on a client device, the VPN gateway may configure the client device to cause security assertion requests directed to the VPN gateway to be sent by the client device to the VPN gateway through the established tunnel. The VPN gateway may detect whether a security assertion request was received through the established tunnel, and issue a security assertion in response to the request without requiring the user to re-authenticate with the VPN gateway when the VPN gateway detects that the security assertion was received through the established tunnel. Receiving a security assertion request through an established tunnel may indicate to the VPN gateway that the user has already successfully authenticated with the VPN gateway. Therefore, according to the techniques described herein, the VPN gateway may safely issue a security assertion for the user without requiring re-authentication. In this way, a VPN gateway may act as a single sign-on (SSO) identity provider for users that have an established tunneling session with the gateway.

In some examples, the VPN gateway may determine whether a security assertion request was received through an established tunnel based on a source IP address included in the communication containing the security assertion request. For example, upon establishing a tunneling session for a particular user on a client device, a VPN gateway may assign a private Internet Protocol (IP) address (e.g., a local IP address internal to and/or managed by the enterprise network) to the client device. The client device may be configured to use the private IP address as a source IP address for tunneled communications. In response to receiving a security assertion request, the VPN gateway may determine whether a source IP address specified in one or more packets that contains the security assertion request is a private IP address. If the source IP address is a private IP address, then the VPN gateway may determine that the security assertion request was received via a tunneling session that has been established for the user, which indicates that the user has already successfully authenticated with the VPN gateway. In this case, the VPN gateway may proceed to issue a security assertion for the user without requiring the user to re-authenticate with the VPN gateway. Otherwise, if the source IP is a public IP address, then the VPN gateway may determine that the security assertion request was not received via a tunneling session, which implies that a tunneling session between the client device and the VPN gateway is currently not established. In this case, the VPN gateway may proceed to authenticate the user prior to issuing a security assertion. In this way, the VPN gateway may determine whether a user associated with a security assertion request has already authenticated with the VPN gateway, and thereby whether a security assertion may be issued without re-authenticating the user.

In some examples, an alternate hostname for receiving security assertion requests may be defined for the VPN gateway, which is resolvable by a client device to either a public IP address or a private IP address depending on whether a tunneling session is established for the user of the client device. When a tunneling session is not established on the client device, the client device may be configured to resolve the alternate hostname to the public IP address associated with the alternate hostname. Upon establishing a tunneling session for a particular user on the client device, the VPN gateway may cause the client device to resolve the alternate hostname to the private IP address associated with the alternate hostname.

In such examples, after a tunneling session has been established, if a web browser executing on the client device requests access to a protected resource to which the VPN gateway acts as an identity provider, the web browser may receive a redirect that instructs the web browser to redirect a security assertion request to the alternate hostname associated with the VPN gateway. Because a tunneling session has already been established, the client device may resolve the alternate hostname to the private IP address associated with the hostname, which in turn may invoke a VPN handler executing on the client device to send one or more packets containing the request through the established tunnel. To send the one or more packets through the tunnel, the VPN handler may use the private IP address assigned to the client device upon establishment of the tunneling session as a source IP address for each of the packets. Upon receiving the security assertion request, the VPN gateway may detect the source address as being a private IP address, and issue a security assertion for the user without requiring the user to re-authenticate with the VPN gateway.

If a tunneling session is not established, in such examples, and the web browser receives a redirect that instructs the web browser to redirect a security assertion request to the alternate hostname associated with the VPN gateway, then the client device may send the security assertion request to the VPN gateway via the public network without tunneling the request. Because a tunneling session is not established, the client device is configured to resolve the alternate hostname to the public IP address associated with the hostname, thereby facilitating the transfer of the security assertion request over the public network. In addition, the client device may use a public IP address associated with the client device as a source IP address for sending one or more packets containing the request. Upon receiving the security assertion request, the VPN gateway may detect the source address as being a public IP address, and cause the user to re-authenticate prior to issuing a security assertion for the user.

The techniques of this disclosure may provide one or more advantages. For example, the techniques of this disclosure may, in some cases, require no additional client-side software components (e.g., browser plug-ins or the like) in order to detect a tunneling session and provide SSO capabilities, even in a computing environment that has Security Assertion Markup Language (SAML)-protected resources. This may reduce the amount and/or complexity of software needed in a client device, which in some cases, may be a device that has relatively limited software resources available (e.g., a mobile phone or a tablet). The techniques of this disclosure may also provide SSO capabilities in both a full-tunneled environment as well as a split-tunneled environment. In addition, the techniques of this disclosure may operate on client devices that utilize domain name system (DNS) caching even if the devices do not support DNS cache cleaning.

FIG. 1 is a block diagram illustrating an example network environment 10 in which a VPN gateway issues tunnel-based security assertions in accordance with the techniques of this disclosure. Network environment 10 includes a client device 12, a Virtual Private Network (VPN) gateway 14, a service provider 16, a public network 18 and a private network 20. Service provider 16 includes protected resource 22.

In the example network environment 10 of FIG. 1, private network 20 may be, for example, an enterprise network associated with an organization, and public network 18 may be an unsecure, publicly accessible network, e.g., the internet. Client device 12 may communicate with VPN gateway 14 via public network 18. For example, client device 12 may establish a tunneling session with VPN gateway 14 such that client device 12 may access protected resources within private network 20 through VPN gateway 14 via tunneling session 24. Tunneling session 24 may utilize public network 18 to provide a secure communications session between client device 12 and VPN gateway 14. Client device 12 may also access protected resource 22 of service provider 16 via public network 18.

In some examples, private network 20 and service provider 16 may occupy different security domains. For example, private network 20 may be part of a first security domain, and service provider 16 may be part of a second security domain different than the first security domain. In further examples, private network 20 and service provider 16 may be associated with different domain names (e.g., different domain name system (DNS) domain names). For example, private network 20 may be associated with and/or addressable by a first domain name, and service provider 16 may be associated with and/or addressable by a second domain name different than the first domain name. In additional examples, the resources in service provider 16 and private network 20 may be managed, hosted, and/or served by different organizations. For example, protected resources in private network 20 may be managed, hosted, and/or served by a first organization and protected resource 22 in service provider 16 may be managed, hosted, and/or served by a second organization different than the first organization.

Client device 12 may be any type of communication device associated with an individual user or employee (e.g., an employee of the organization that manages and hosts private network 20). For example, client device 12 may be a personal computer, a personal digital assistant (PDA), a smart-phone, a laptop computer, a video-game console, an application running thereon (e.g., a web browser), or other type of computing device or application that is capable of requesting access to and consuming resources within private network 20 and service provider 16.

In general, the resources included in private network 20 may include web servers, application servers, database servers, file servers, software applications, web services, web applications or any other electronic resource. Because such resources are situated in private network 20, such resources are typically not available to the public over public network 18. Instead, registered users of private network 20 typically provide authentication credentials to access the resources in private network 20. Users may access the resources in private network 20 from local host devices within private network 20 (e.g., from devices within the organization associated with private network 20) and/or access such resources remotely from client devices, such as client device 12, via public network 18.

VPN gateway 14 is positioned between public network 18 and private network 20 and provides VPN services to remote clients, such as, e.g., client device 12. In other words, VPN gateway 14 may provide secure and controlled access to resources within private network 20 for client devices by establishing one or more VPN tunnels between remote client devices and private network 20. In some examples, VPN gateway 14 may be a secure sockets layer (SSL) VPN appliance that provides SSL VPN services to one or more remote client devices. In such examples, VPN gateway 14 may be configured to establish an SSL tunnel 24 between client device 12 and VPN gateway 14 in response to receiving authentication credentials from a user of client device 12. Example details regarding SSL VPN appliances and their operation may be found in "Juniper Networks Secure Access Administration Guide, Release 7.0, Revision 2," Juniper Networks, Inc., 2011, which is incorporated herein by reference in its entirety.

In additional examples, VPN gateway 14 may be an Internet Protocol Security (IPSec) VPN appliance that provides IPSec VPN services to one or more remote client devices. In such examples, VPN gateway 14 may be configured to establish an IPSec tunnel 24 between client device 12 and VPN gateway 14 in response to receiving authentication credentials from a user of client device 12. In further examples, VPN gateway 14 may provide both SSL VPN services and IPSec VPN services. In more examples, VPN gateway 14 may be incorporated within other devices, such as an intrusion detection and prevention (IDP) system, a firewall, a unified threat management (UTM) device, a router, or other network devices.

In order to access resources within private network 20, a user may launch a tunnel establishment client on client device 12 that authenticates client device 12 with VPN gateway 14. The tunnel establishment client may also negotiate any security parameters needed to establish the tunnel with VPN gateway 14. For example, the tunnel establishment client may exchange digital certificates with VPN gateway 14, exchange public keys with VPN gateway 14, generate pairs of security associations for use by client device 12 and VPN gateway 14, etc. In some examples, the tunnel establishment client may execute within a browser window. For example, a browser may present a user interface that requests security credentials from the user. In additional examples, the tunnel establishment client may be a stand-alone software module that executes separate from the browser. For example, the user may launch a stand-alone application that is separate from the browser and which requests security credentials from the user. The tunnel establishment client may also invoke and/or launch a VPN handler to manage incoming traffic received via tunneling session 24 from VPN gateway 14 and outgoing traffic destined for VPN gateway 14 via tunneling session 24.

As part of the tunnel establishment process, VPN gateway 14 may assign a private IP address to client device 12, and configure the VPN handler executing in client device 12 to use the private IP address as an encapsulated source IP address for tunneled communications. VPN gateway 14 may also configure a name resolver in client device 12 to resolve hostnames and device names associated with private network 20 to private IP addresses internal to private network 20. For example, VPN gateway 14 may configure a host table in client device 12 such that the name resolver resolves the hostnames and device names to private IP addresses. As another example, VPN gateway 14 may configure the name resolver to query a root name server internal to private network 20 rather than a public DNS server.

Tunneling session 24 may be, for example, a secure data connection where data is communicated in accordance with a security protocol, such as, e.g., a Secure Sockets Layer (SSL) protocol or an Internet Protocol Security (IPSec) protocol. That is, an SSL VPN may be used to tunnel IP packets on top of a Layer 4 connection oriented protocol, e.g., Transmission Control Protocol (TCP). Alternatively, an IPSec VPN may be established to tunnel encrypted IP packets, i.e., Encapsulation Security Payload (ESP) packets, on top of a connection-less protocol, e.g., IP or User Datagram Protocol (UDP). In additional examples, tunnel 24 and may utilize an MPLS label switched path (LSP) between routers within public network 18.

Tunneling session 24 may pass data between client device 12 and VPN gateway 14 in an encapsulated form. For example, prior to transmitting a particular data unit over tunneling session 24, client device 12 and/or VPN gateway 14 may encapsulate an inner data unit inside of an outer data unit. The inner and outer data units may each include a header portion and a payload portion, and the inner data unit may be included in the payload portion of the outer data unit. In some cases, the inner data unit may be encrypted.

Each of the data units may include a source IP address and a destination IP address. In general, the source IP address for the inner data unit may be a private IP address associated with private network 20, the destination IP address for the inner data unit may be a public or private IP address, and the source and destination IP addresses for the outer data unit may be public IP addresses. Private IP addresses may include IP addresses from a private pool of IP addresses that are associated with, managed by, and/or internal to private network 20. Private IP addresses may not necessarily be routable by public network 18. Public IP address may include IP addresses from a pool of public IP addresses associated with public network 18 and may be routable by public network 18. Public IP addresses may be assigned to devices by an Internet Service Provider (ISP) while a private IP address may be assigned by a management authority of a private network.

For a data unit traveling from client device 12 to VPN gateway 14 through tunneling session 24, the source IP address of the inner data unit may be a private IP address assigned to client device 12 upon establishing a tunnel session, the destination IP address of the inner data unit may be a private IP address associated with a resource or device of private network 20 or a public address associated with public network 18, the source IP address of the outer data unit may be a public IP address assigned to client device 12, and the destination IP address may be a public IP address assigned to VPN gateway 14. Similarly, for a data unit traveling from VPN gateway 14 to client device 12 through tunneling session 24, the source IP address of the inner data unit may be a private IP address associated with a resource or device of private network 20 or a public address associated with public network 18, the destination IP address of the inner data unit may be a private IP address assigned to client device 12 upon establishing a tunnel session, the source IP address of the outer data unit may be a public IP address assigned to VPN gateway 14, and the destination IP address may be a public IP address assigned to client device 12.

For non-tunneled data, the data units are typically not encapsulated. Thus, one or more data units each having a single source IP address and a single destination IP address is typically transmitted. For a data unit traveling from client device 12 to VPN gateway 14 in the non-tunneled case, the source IP address of the data unit may be a public IP address assigned to client device 12, and the destination IP address may be a public IP address assigned to VPN gateway 14. Similarly, for a data unit traveling from VPN gateway 14 to client device 12 in the non-tunneled case, the source IP address of the data unit may be a public IP address assigned to VPN gateway 14, and the destination IP address may be a public IP address assigned to client device 12.

For an SSL VPN gateway 14, the data units may be application layer data units and/or transport layer data units, e.g., Transmission Control Protocol (TCP) segments. For an IPSec VPN gateway 14, the data units may be network layer data units, e.g., IP datagrams.

Service provider 16 may be any type of computing device configured to manage access to and serve protected resource 22. Protected resource 22 may be for example, a web application, a web document, a database server, a file server, or the like. Service provider 16 manages access to protected resource 22 via a security assertion protocol. The security assertion protocol allows service provider 16 to rely upon security assertions issued by identity providers, which are sometimes in different security domains that service provider 16, to control access to protected resource 22. The security assertion may include, for example, an authentication assertion that indicates that a particular user who is requesting access to protected resource 22 has properly authenticated with the identity provider. In the example network environment 10 of FIG. 1, service provider 16 relies upon security assertions issued by VPN gateway 14, which acts as an identity provider, in order to grant a user of client device 12 access to protected resource 22. The security assertion protocol may be a predetermined, pre-negotiated protocol based on a trust relationship between the organization that manages service provider 16 and the organization that manages private network 20. In the context of this trust relationship, service provider 16 may be referred to as a relying party and VPN gateway 14 may be referred as an asserting party. In some examples, the security assertion protocol may conform to a public and/or proprietary standard for exchanging authentication information. For example, the security assertion protocol may conform to the Security Assertion Markup Language (SAML) protocol. Further details regarding the SAML protocol can be found in "Assertions and Protocols for the OASIS Security Assertion Markup Language (SAML) V2.0," Organization for the Advancement of Structured Information Standards (OASIS), Mar. 15, 2005; "Authentication Context for the OASIS Security Assertion Markup Language (SAML) V2.0," OASIS, Mar. 15, 2005; and "Security Assertion Markup Language (SAML) V2.0 Technical Overview," OASIS, Mar. 25, 2008; the entire content of each of which is incorporated herein by reference.

In accordance with the techniques of this disclosure, VPN gateway 14 may be configured to issue security assertions for users that have already established tunneling sessions with VPN gateway 14 in response to receiving security assertion requests for the users and without requiring such users to re-authenticate with VPN gateway 14. For example, VPN gateway 14 may receive a security assertion request for a user of VPN gateway 14 associated with private network 20 from client device 12, determine whether the security assertion request was received via tunneling session 24 established for the user between client device 12 and VPN gateway 14, and issue a security assertion for the user in response to determining that the security assertion request was received via tunneling session 24. Receiving a security assertion request through an established tunneling session may indicate to VPN gateway 14 that the user has already successfully authenticated with the VPN gateway. Therefore, VPN gateway 14 may safely issue a security assertion for the user without requiring re-authentication. In this way, a VPN gateway may act as a single sign-on (SSO) identity provider for users that have an established tunneling session with the gateway.

When a tunneling session is not established, client device 12 may send security assertions to VPN gateway 14 via public network 18 outside of any tunneling session. When tunneling session 24 is established, VPN gateway 14 may cause client device 12 to redirect security assertions to VPN gateway 14 through the tunnel. Upon establishing tunneling session 24 for a particular user on client device 12, VPN gateway 14 may assign a private IP address to client device 12. Client device 12 may use the assigned private IP address as a source IP address for communications that are sent to VPN gateway 14 via tunneling session 24. For communications sent to VPN gateway 14 outside of tunneling session 24, client device 12 may use a public IP address (e.g., an IP address assigned by an internet service provider) as a source IP address for communications. Thus, in response to receiving a security assertion request, VPN gateway 14 may use the source IP address of one or more data units (e.g., packets) associated with the received security assertion request to determine whether the user associated with the security assertion request has already successfully established a tunneling session with VPN gateway 14. If the source IP address is a private IP address, then VPN gateway 14 may determine that the security assertion request was received via tunneling session 24, which indicates that the user has already successfully authenticated with VPN gateway 14. Therefore, VPN gateway 14 may proceed to issue a security assertion for the user without requiring the user to re-authenticate with VPN gateway 14. Otherwise, if the source IP is a public IP address, then VPN gateway 14 may determine that the security assertion request was not received via a tunneling session, which implies that the a tunneling session between client device 12 and VPN gateway 14 is currently not established. In this case, VPN gateway 14 may proceed to authenticate the user prior to issuing a security assertion. In this way, VPN gateway 14 may determine whether a user associated with a security assertion request has already authenticated with VPN gateway 14, and thereby whether a security assertion can be issued without re-authenticating the user.

When service providers redirect client devices to an identity provider, service providers typically specify the hostname of the identity provider to which the security assertion request should be redirected. In the example network environment 10 of FIG. 1, this hostname may be a hostname that corresponds to VPN gateway 14. For conventional VPN gateways, even after a tunneling session has been established, a communication that is destined to the hostname of the VPN gateway is typically not tunneled. This means that, for a tunneling session established between a client device and a conventional VPN gateway, if the client device is redirected by a service provider to the conventional VPN gateway to request a security assertion, such a redirect would be sent from the client to the VPN gateway outside of the established tunneling session, i.e., the request would not be tunneled. The single sign-on techniques of this disclosure, however, may rely, in some examples, upon the security assertion request being tunneled when a tunneling session has been established in order to detect that the user has already authenticated with the VPN gateway.

The decision on whether to tunnel particular packets data is typically handled by a low-level VPN handler (e.g., a software module executing in the operating system kernel of the client device) and client-side web browsers are typically not aware of whether such a VPN handler is executing. That is, the VPN handler may be effectively transparent to the web browser executing on the client device. Therefore, although a web browser may be able to detect that a security assertion request is to be redirected to a VPN gateway, the web browser is not necessarily able to cause such a request to be tunneled. Moreover, although the VPN handler may be able to selectively tunnel packets of data, the low-level position of the VPN handler in the networking stack means that the VPN handler is not necessarily able to detect whether a particular packet is part of a security assertion request.

To accomplish the selective tunneling of security assertion requests, an alternate hostname for receiving security assertion requests may be defined for VPN gateway 14, which is resolvable by the client devices to either a public IP address associated with VPN gateway 14 or a private IP address associated with VPN gateway 14 depending on whether a tunneling session is established for the user of the client device. In such examples, when a tunneling session is not established between client device 12 and VPN gateway 14, client device 12 may be configured to resolve the alternate hostname to the public IP address associated with VPN gateway 14. Because a tunneling session is not established, the packets associated with the security assertion request are not tunneled, but rather sent to VPN gateway 14 via public network 18 using the public IP address. Upon establishing a tunneling session for a particular user on client device 12, VPN gateway 14 may cause the client device to resolve the alternate hostname to the private IP address associated with VPN gateway 14. Resolving the alternate hostname to the private IP address may in turn invoke the VPN handler of client device 12 to send one or more packets containing the security assertion request to VPN gateway 14 via the established tunnel. In this way, VPN gateway 14 may selectively cause security assertion requests to be tunneled by a client device without the web browser or VPN handler needing to be aware of the process.

Figure 2:
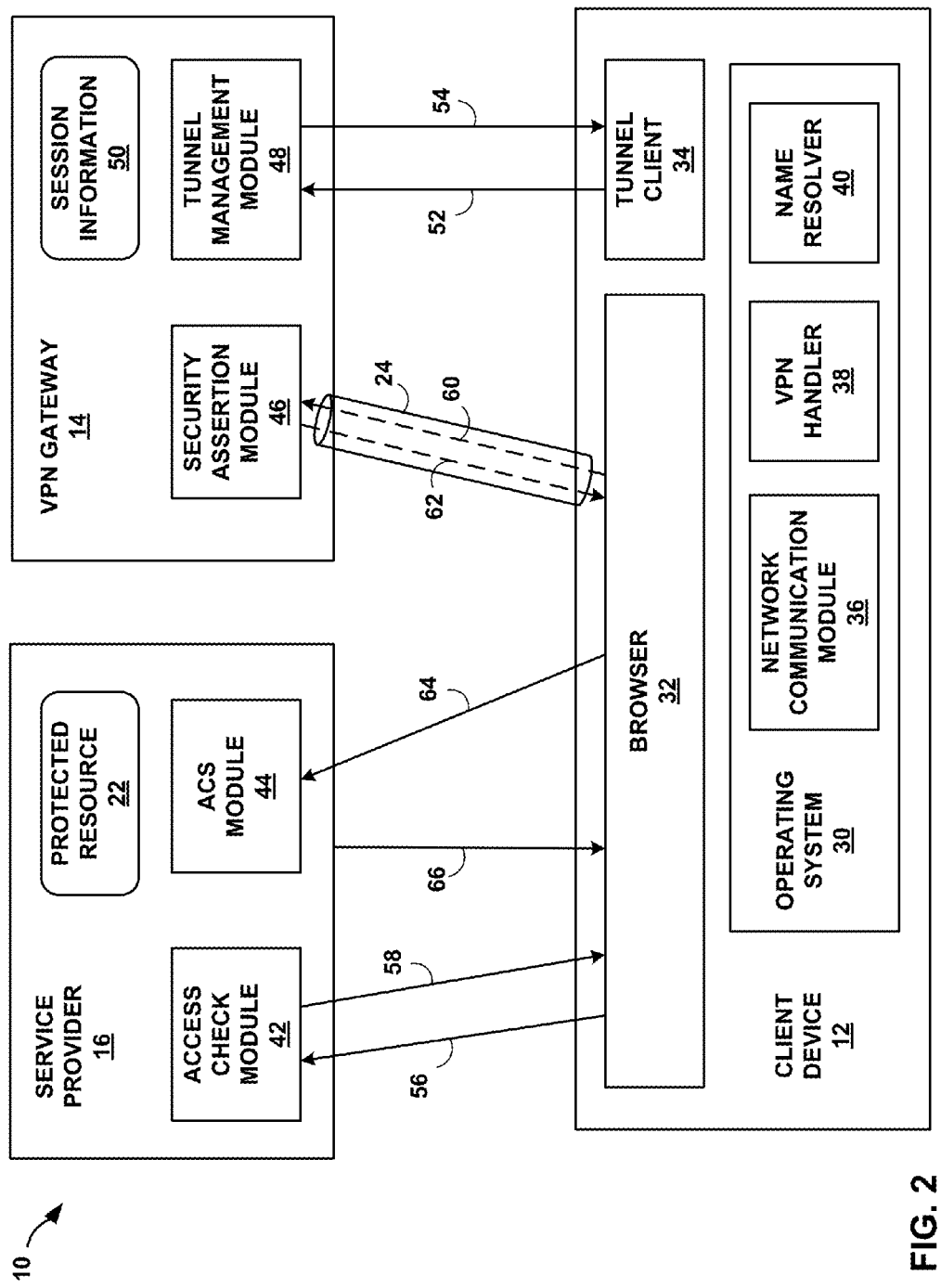
FIG. 2 is a block diagram illustrating an example implementation of the network environment of FIG. 1 in greater detail and an exemplary signal flow in which a client device authenticates with a VPN gateway prior to requesting access to a protected resource located on a service provider in accordance with the techniques of this disclosure.

FIG. 2 is a block diagram illustrating an example implementation of network environment 10 of FIG. 1 in greater detail and an exemplary signal flow in which client device 12 signs on to VPN gateway 14 prior to requesting access to protected resource 22 located on service provider 16. As shown in FIG. 2, client device 12 includes an operating system 30, a browser 32 and a tunnel client 34. Operating system 30 includes a network communication module 36, a VPN handler 38 and a name resolver 40. Service provider 16 includes an access check module 42, an Access Consumer Service (ACS) module 44 and protected resource 22. VPN gateway 14 includes a security assertion module 46, a tunnel management module 48 and session information 50.

Client device 12 may include hardware that provides core functionality for operation of the device. The hardware may include, for example, one or more programmable microprocessors configured to operate according to executable instructions (i.e., program code), typically stored in a computer-readable medium such as a static, random-access memory (SRAM) device or a Flash memory device. The hardware may also include an input/output (I/O) subsystem that provides a network interface for communicating with public network 18. The network interface may be a wired or wireless interface, such as an Ethernet, fiber optic, token ring, modem, or other network interface. The hardware may also include additional discrete digital logic or analog circuitry. VPN gateway 14 and service provider 16 may also include similar hardware and I/O subsystems.

Operating system 30 executes on the hardware (e.g., one or more processors) and provides an operating environment for one or more applications. In one example, operating system 30 provides an interface layer for receiving kernel calls from user applications, such as, e.g. browser 32 and tunnel client 34. In addition, operating system 30 provides a framework within one or more of network communication module 36, VPN handler 38 and name resolver 40 operate and may, for example, allow one or more of these components to execute within a "kernel" space of the operating environment provided by client device 12. VPN handler 38 may register with operating system 30 to provide a single point of entry for network traffic so as to transparently apply VPN services to the network traffic.

When a tunneling session has not been established, operating system 30 may route inbound and outbound communications to network communication module 36, which may provide access to lower levels of the network stack (e.g., the Open Systems Interconnection (OSI) stack) for routing packets to and from public network 18. Network communication module 36 may also access name resolver 40 to resolve any hostnames for outbound communications. Name resolver 40 may resolve host names to corresponding IP addresses. For example, name resolver 40 may use a host table, a name cache, and/or query one or more name servers in a name system in order to resolve a received hostname to an IP address. The one or more name servers may include servers within a centralized server system or a distributed server system accessible by public network 18. In some examples, name resolver may be a DNS name resolver and resolve hostnames using the DNS naming system.

When a tunneling session has been established, operating system 30 may route outbound communications received from user applications, such as browser 32, to VPN handler 38 for processing prior to providing such communications to network communication module 36. When VPN handler 38 receives an outbound message from operating system 30, VPN handler 38 may determine whether the outbound communication needs to be tunneled. In some examples, VPN handler 38 may be configured to tunnel communications according to a full tunneling protocol, e.g., a tunneling protocol that specifies that all communications should be tunneled except for those that are destined to the public IP address for VPN gateway 14. In such examples, VPN handler 38 may determine whether to tunnel a particular communication based on whether the destination address for the outgoing communication is a public IP associated with VPN gateway 14. If the destination IP address is a public IP address associated with VPN gateway 14, then VPN handler 38 may determine not to tunnel the outgoing communication. Otherwise, if the destination IP address is not a public IP address associated with VPN gateway 14 (e.g., a private IP address associated with private network 20 or another public address associated with public network 18), then VPN handler 38 may determine to tunnel the outgoing communication according to a tunneling protocol.

In additional examples, VPN handler 38 may be configured to tunnel communications according to a split tunneling protocol, e.g., a tunneling protocol that specifies that communications directed to private IP addresses within private network 20 should be tunneled and communications directed to public IP addresses associated with public network 18 should not be tunneled. In such examples, VPN handler 38 may determine whether to tunnel a particular communication based on whether the destination address for the outgoing address is a private IP associated with private network 20. If the destination IP address is a private IP associated with private network 20, then VPN handler 38 may determine to tunnel the outgoing communication according to a tunneling protocol. Otherwise, if the destination IP address is not is a private IP associated with private network 20 (e.g., a public IP address associated with public network 18), then VPN handler 38 may determine not to tunnel the outgoing communication.

If VPN handler 38 determines that an outgoing message should be tunneled, VPN handler 38 may generate a tunneled data unit that includes an outer data unit which encapsulates an inner data unit. The outer data unit and the inner data unit may each include a header portion and a payload portion. Each of the header portions may include a source IP address and a destination IP address. The payload of the inner data unit may include the message content to be communicated to a third party device. The payload of the outer data unit may include the inner data unit, i.e., the header portion and the payload portion of the inner data unit. The source IP address specified in the inner data unit may be a private IP address assigned to client device 12 by VPN gateway 14 upon the establishment of a tunneling session, and the destination IP address of the inner data unit may be a private or public IP address depending on the destination of the message. The source IP address of the outer data unit may be a public IP address associated with client device 12, and the destination IP address of the outer data unit may be a public IP address associated with VPN gateway 14. In some examples, VPN handler 38 may encrypt the inner data unit (e.g., the header portion and the payload portion) according to one or more encryption protocols. In further examples, VPN handler 38 may append authentication information for the inner data unit according to one or more authentication protocols. VPN handler 38 may provide the tunneled data unit to network communication module 36 to route, via public network 18, to the destination specified by the destination IP address in the header portion of the outer data unit.

Similarly, when a tunneling session has been established, operating system 30 may route inbound communications received from network communication module 36 to VPN handler 38 for processing prior to providing such communications to user applications, such as browser 32. When VPN handler 38 receives an inbound message from operating system 30 and/or network communication module 36, VPN handler 38 may determine whether the inbound message includes a tunneled data unit. For example, VPN handler 38 may determine whether the received data unit encapsulates an inner data unit that has a private destination IP address. If VPN handler 38 determines that the communication includes a tunneled data unit, VPN handler 38 may de-encapsulate the data unit prior to passing the data unit to the upper layers of the network stack. For example, VPN handler 38 may extract the inner data unit from the payload portion of the outer data unit and remove the header portion of the outer data unit. In further examples, VPN handler 38 may decrypt the inner data unit according to one or more encryption protocols. In further examples, VPN handler 38 may verify the authentication information for the inner data unit according to one or more authentication protocols. VPN handler 38 may provide the resulting de-encapsulated data unit to operating system 30 and/or network communication module 36 for further processing, which in turn may provide the data unit to a user application, e.g. browser 32. If VPN handler 38 determines that the message does not include a tunneled data unit, VPN handler 38 may pass the message to the upper layers of the network stack without necessarily performing any de-encapsulation.

In some examples, VPN handler 38 may be configured to encapsulate and de-encapsulate data units according to an IPSec tunneling protocol. The IPSec tunneling protocol may include, for example, a tunnel mode Authentication Only (AH) tunneling protocol or a tunnel mode Encapsulating Security Payload (ESP) tunneling protocol. In additional examples, VPN handler 38 may be configured to encapsulate and de-encapsulate data units according to an SSL tunneling protocol. The SSL tunneling protocol may include, for example, an SSL mode and an ESP mode.

Browser 32 may be any web browser capable of allowing a user to access protected resource 22. For example, browser 32 may be configured to request resources using a universal resource indicator (URI) or a universal resource locator (URL). Browser 32 may allow a user to access protected resource 22, for example, by entering a URI or URL into an address bar and/or activating a hyperlink that navigates the browser to protected resource 22. In some examples, browser 32 may be a web browser such as, e.g., an Internet Explorer browser, a Mozilla Firefox browser, a Safari browser, an Opera browser or the like. Browser 32 may be configured to redirect security assertion requests and security assertions according to the techniques described herein.

Tunnel client 34 is configured to establish a tunneling session 24 with VPN gateway 14. Tunnel client 34 may request user credentials to establish authentication and/or authorization. User credentials may include, for example, a username-password pair, a biometric identifier, data stored on a smart card, a one-time password token or a digital certificate. In some cases, tunnel client 34 may present a login page for receiving credentials from the user. For example, when accessing private network 20, a user associated with client device 12 may direct a web browser executing on client device 12 to a URL associated with the enterprise. In this case, tunnel client 34 may present a web page on client device 12 via browser 32 to capture the credentials required from the user. Upon receiving the credentials from the user, tunnel client 34 may present the credentials to tunnel management module 48 on VPN gateway 14. Based on the provided credentials, tunnel management module 48 may grant or deny access to private network 20. In some examples, tunnel management module 48 may communicate with an authentication, authorization and accounting (AAA) server to authenticate the credentials. The AAA server may execute on VPN gateway 14 or on a separate network device and may be, for example, a Remote Authentication Dial-In User Service (RADIUS) server.

Tunnel client 34 and tunnel management module 48 may negotiate security parameters associated with tunnel 24, including, e.g., the type/version of an encryption algorithm, and symmetric keys for encrypting/decryption data transported via tunneling session 24. Upon establishing a tunneling session, tunnel management module 48 may assign a private IP address to client device 12, and configure name resolver 40 to resolve the alternate hostname to a private IP address associated with VPN gateway 14. Tunnel client 34 may initiate the execution of VPN handler 38 upon the establishment of a tunneling session if VPN handler 38 is not already executing on operating system 30.

Access check module 42 is configured to receive security assertion requests and determine whether the requester already has an established session with service provider 16. If the user does have an established session with service provider 16, access check module 42 may grant access to protected resource 22. Otherwise, if the user does not have an established session with service provider 16, access check module 42 may redirect the requester to an identity provider, e.g., VPN gateway 14, to obtain a security assertion. ACS module 44 is configured to receive security assertions from client devices, and to grant or deny users access to protected resource 22 based on the content of the security assertion. Security assertion module 46 is configured to manage the receipt of security assertion requests and the issuance of security assertions in response to security assertion requests. Tunnel management module 48 is configured to establish and manage tunneling sessions between client devices and VPN gateway 14. Session information 50 is configured to store information relating to established tunneling sessions. For example, session information 50 may store a private IP address and username combination associated with a particular tunneling session.

The operation of network environment 10 will now be described for the case where a user on client device 12 signs on to VPN gateway 14 prior to requesting access to protected resource 22 located on service provider 16. VPN gateway 14 may be associated with a standard hostname and an alternate hostname. The standard hostname may be used to access VPN gateway 14 for purposes other than security assertion requests, and the alternate hostname may be used for sending and receiving security assertion requests. Prior to authenticating with VPN gateway 14, name resolver 40 is configured to resolve the alternate hostname to a public IP address associated with VPN gateway 14. Tunnel client 34 provides the user credentials to tunnel management module 48 via message 52. The user credentials may be authentication credentials, such as, e.g., a username-password pair. Tunnel management module 48 verifies the user credentials. If the user credentials are valid, tunnel management module 48 and tunnel client 34 negotiate and establish tunneling session 24. Upon establishing the tunneling session, tunnel management module 48 assigns a private IP address to client device 12, and configures name resolver 40 to resolve the alternate hostname to a private IP address associated with VPN gateway 14. The private IP address associated with VPN gateway 14 may be different than the private IP address assigned to client device 12. Tunnel management module 48 may use one or more messages 54 to assign the private IP address and/or reconfigure name resolver 40.

In order to configure name resolver 40 to resolve the alternate hostname to a private IP address associated with VPN gateway 14, tunnel management module 48 may, in some examples, change a root name server pointer accessible by name server 40 to point to a root name server that associates the hostname with a private IP address. For example, prior to establishing tunneling session 24, name resolver 40 may include a root name server pointer that points to a public root name server associated with public network 18, e.g., a publicly accessible DNS server associated with the DNS naming system. After the tunneling session has been established, in such an example, tunnel management module 48 may configure the root name server pointer to point to a private root name server that is managed by private network 20. In additional examples, tunnel management module 48 may configure name resolver 40 to resolve the alternate hostname to a private IP address associated with VPN gateway 14 by placing an entry in a host table used by name resolver 40. The entry may associate the alternate hostname with the private IP address associated with VPN gateway 14.

After establishing a tunneling session, a user directs browser 32 to access protected resource 22 on service provider 16. Browser 32 sends a request 56 to access check module 42 requesting access to protected resource 22. The destination hostname for request 56 may be a hostname that is agreed upon by service provider 16 and the organization associated with VPN gateway 14. For example, request 56 may provide a same type of protected resource to a plurality of different organizations and each organization may access the type of protected resource via a different URL that is specific to that organization. Request 56 may include information identifying the user that is requesting the protected resource, and in some examples, information identifying the protected resource to be accessed (i.e., protected resource 22 in this example). In some examples, request 56 may be a request that conforms to a world wide web communications protocol, such as, e.g., a hypertext transfer protocol (HTTP) request.

In response to receiving request 56, access check module 42 may determine whether the user identified in request 56 already has an established session with service provider 16. Access check module 42 may determine whether a requester has an established session with service provider 16, for example, by accessing a session token or cookie placed in the requester's browser when the session was established. If the user has an established session with service provider 16, access check module 42 may grant access to protected resource 22. Otherwise, if the user does not have an established tunneling session with service provider 16, then service provider 16 determines that the user will need to be authenticated. A prior trust agreement established between service provider 16 and the organization that manages private network 20 may indicate that service provider 16 should send a redirect to client device 12 to request a security assertion from VPN gateway 14. Access check module 42 sends a redirect 58 to browser 32 of client device 12. Redirect 58 may include a security assertion request. The security assertion request may include one or more of following: information identifying the subject of the assertion request (i.e., the user to which the assertion request pertains), a hostname of an identity provider for servicing the request, identification of the ACS to which the security assertion should be returned, and any specific content that is required to be present in the assertion including whether a specific means of authentication is required. In some cases, the security assertion request may be referred to as an authentication request. In the example of FIG. 2, redirect 58 includes a security assertion request that specifies the user that requested access to protected resource 22 via request 56, the alternate hostname associated with VPN gateway 14, and a hostname associated with ACS module 44. In some examples, redirect 58 may be an HTTP redirect message (e.g., HTTP Status 302 or 303) where the location header includes the alternate hostname of VPN gateway 14 and the security assertion request is encoded as a URL query variable.

In response to receiving redirect 58, browser 32 may send message 60 to security assertion module 46 of VPN gateway 14. Message 60 may include the security assertion request included in redirect 58, and be sent to the alternate hostname specified in redirect 58. Because a tunneling session has been established, name resolver 40 is configured to resolve the alternate hostname to the private IP address associated with VPN gateway 14, which in turn causes VPN handler 38 to send message 60 to security assertion module 46 via tunneling session 24. That is, VPN handler 38 generates one or more tunneled packets containing the message content for message 60. Each of the one or more tunneled data packets may include an outer data packet an inner data packet. The inner and outer data packets may include header portions and payload portions. The payload portion of the outer packet may include the header portion and payload portion of the inner packet. The source IP address included in the header portion of the inner packet may be the private IP address assigned to client device 12 upon establishment of the tunneling session. In some examples, the payload of the outer packet, which includes the inner packet, may be encrypted. In some examples, message 60 may be a tunneled HTTP GET request.

In response to receiving message 60 from browser 32, security assertion module 46 of VPN gateway 14 may determine whether message 60 was received via a tunneling session. For example, security assertion module 46 may determine that message 60 was received via a tunneling session in response to determining that the source IP address included in the header of the inner packet of the tunneled data packet is a private IP address. In cases where the inner packet is encrypted, security assertion module 46 may decrypt the inner packet to detect whether the source IP address of the inner packet is a private IP address. In some examples, after determining that the source IP is a private IP address, security assertion module 46 may use session information 50 to verify that a valid tunneling session corresponds to the received message 60. For example, security assertion module 46 may determine whether there is a tunneling session entry in session information 50 corresponding to the private source IP address included in message 60 and whether the tunneling session entry is associated with the same user as the user identified in security assertion request included in message 60. Receiving the security assertion request included in message 60 via an established and valid tunneling session indicates that the user has already authenticated with VPN gateway 14. Accordingly, if security assertion module 46 determines that message 60 was received via a valid tunneling session, security assertion module 46 may issue security assertion 62 without requiring the user on client device 12 to re-authenticate with client device 12.

Security assertion 62 may include one or more statements asserting security information about a subject, which in this example is the user requesting access to protected resource 22. The one or more statements may include one or more authentication statements, one or more attribute statements, and/or one or more authorization statements. An authentication statement may be a statement by VPN gateway 14 that a particular user was authenticated by a particular authentication means at a particular time. That is, the authentication statement may be a statement indicative that the user has successfully authenticated with VPN gateway 14, which in this example happened when the tunneling session was established. The authentication statement may include, in some examples, a description of the particular means used to authenticate the user, such as, e.g., whether a password was used, whether a password protected transport mechanism was used, whether a digital signature was used, whether a digital certificate was used, and/or whether an authentication certificate was used. The authentication statement may also include, in some examples, the specific time and date that the authentication took place. The authentication statement may also include, in some examples, time-based validity conditions, such as, e.g., this security assertion is not valid prior to a particular date or time or this security assertion is not valid after a particular date or time.

An attribute statement, if included in security assertion 62, may contain specific attributes about the user, such as, e.g., particular groups within the organization in which the user is enrolled or status information about the user. An authorization statement, if included in security assertion 62, may define some action that the user is able to do, e.g., whether the user is able to make a purchase.

Security assertion 62 may include information that identifies the user being asserted. The identity information may include, for example, an email address, an X.509 subject name, a Windows domain qualified name, a Kebros principal name, an entity identifier, a persistent identifier, a transient identifier or any other means of identifying the user. In some cases, security assertion 62 may not necessarily include identity information in which case identity may be determined through other means such as, e.g., a certificate used for subject confirmation.

In some examples, security assertion 62 may be formulated in a markup language. For example, security assertion 62 may be formulated in the Extensible Markup Language (XML). In further examples, security assertion 62 may conform to a security assertion protocol, such as, e.g., the SAML protocol. In additional examples, security assertion may include the digital signature of VPN gateway 14 or other authentication and/or integrity information for VPN gateway 14.

As shown in the example signal flow of FIG. 2, security assertion 62 may be sent to client device 12 via tunneling session 24. However, in other examples, security assertion 62 may be sent to client device 12 outside of tunneling session 24, i.e., security assertion 62 may not be tunneled in such examples.

Browser 32, upon receiving security assertion 62, forwards security assertion 62 to ACS module 44 via message 64. In some examples, message 64 may be sent to a hostname specified in the original security assertion request. Message 64 may, for example, be an HTTP POST response that includes the security assertion sent by message 62.

ACS module 44 receives the security assertion via message 64, determines whether the security assertion is valid, and grants or denies the user access to protected resource 22 depending on whether the security assertion is valid. If ACS module 44 grants access to protected resource 22, ACS module 44 may, for example, allow the user to download protected resource 22 and/or present a web page in browser 32 that allows the user to view protected resource 22 either of which may take place via one or more messages 66.

As described above with respect to FIG. 2, upon establishing a tunneling session, tunnel management module 48 configures name resolver 40 to resolve the alternate hostname to a private IP address associated with VPN gateway 14. When browser 32 receives redirect 58, which includes a security assertion request that specifies the alternate hostname for VPN gateway 14 as the identity provider to service the request, name resolver 40 resolves the alternate hostname to the private IP address, which in turn invokes VPN handler 38 to send message 60, which includes the security assertion request, to security assertion module 46 through tunnel 24. When sending message 60 through the tunnel, VPN handler 38 uses a private IP address assigned to client device 12 as the source IP address for message 60. Security assertion module 46 detects the source IP address as being a private IP address, which indicates that the user has an established tunneling session with VPN gateway 14 and that the user has already authenticated with VPN gateway 14. Therefore, security assertion module 46 may safely issue a security assertion for the user without requiring the user to re-authenticate with VPN gateway 14. In this way, VPN gateway 14 may provide SSO functionality to users who access protected resource 22 and who have already authenticated with VPN gateway 14 to establish a tunneling session.

Figure 3:
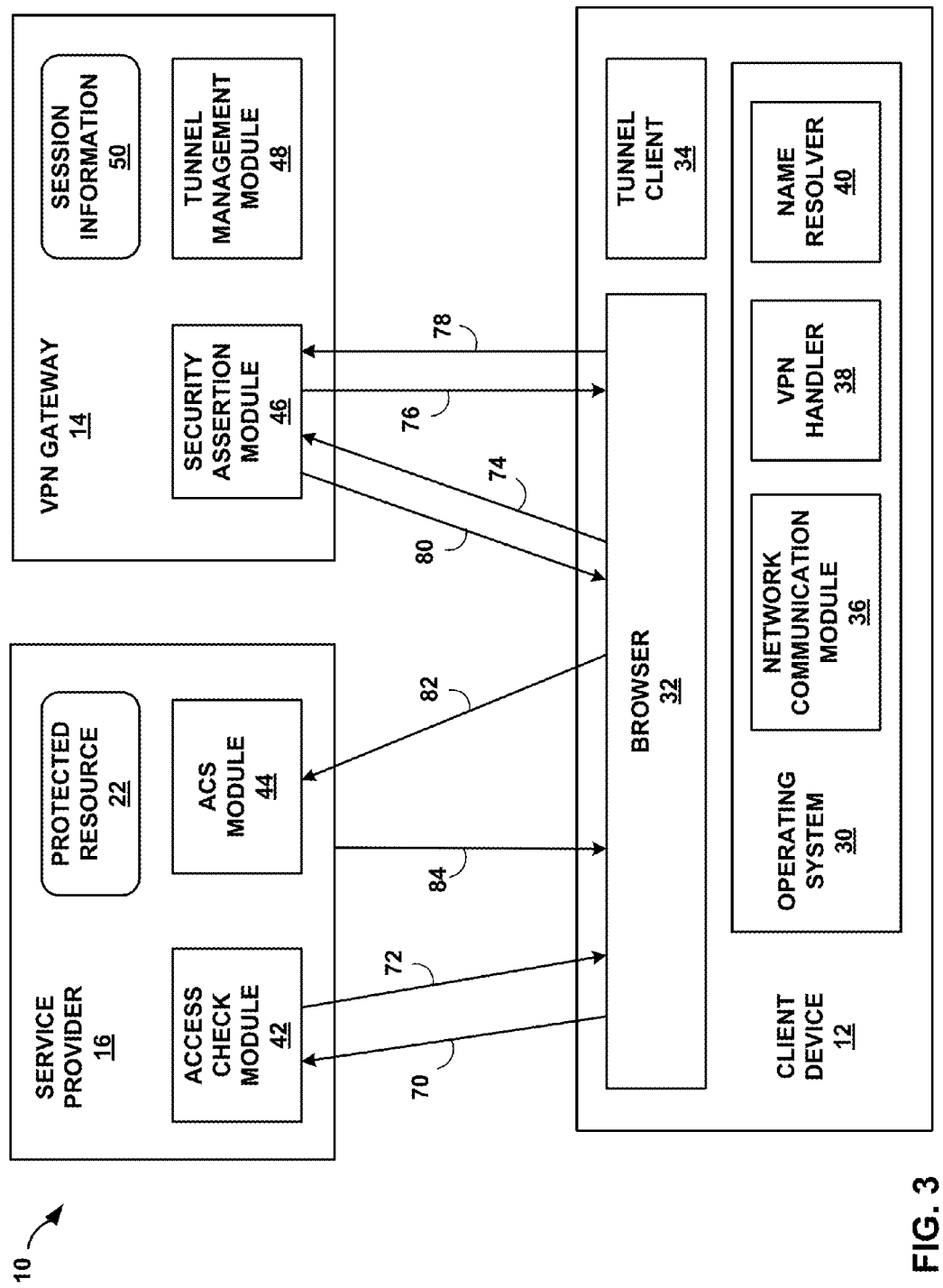
FIG. 3 is a block diagram illustrating the example network environment shown in FIG. 2 with an exemplary signal flow in which the client device requests access to the protected resource located on the service provider prior to signing on to the VPN gateway in accordance with the techniques of this disclosure.

FIG. 3 is a block diagram illustrating the example implementation of network environment 10 shown in FIG. 2 with an exemplary signal flow in which client device 12 requests access to protected resource 22 located on service provider 16 prior to signing on to VPN gateway 14. Initially, client device 12 does not have a tunneling session established with VPN gateway 14, and name resolver 40 is configured to resolve the alternate hostname to a public IP address associated with VPN gateway 14.

A user directs browser 32 to access protected resource 22 on service provider 16. Browser 32 sends a request 70 to access check module 42 requesting access to protected resource 22. In response to receiving request 70, access check module 42 sends a redirect 72 to browser 32 of client device 12 if a session has not already been established between client device 12 and service provider 16. Redirect 72 includes a security assertion request that specifies the alternate hostname for VPN gateway 14 as the identity provider to service the request. Request 70, redirect 72 and the security assertion request may be substantially similar to request 56, redirect 58 and the security assertion request, respectively, described above with respect to FIG. 2. Therefore, for the sake of brevity and to avoid redundancy, the content and formulation of request 70, redirect 72 and the security assertion request will not be described in further detail.

Browser 32 receives redirect 72 and sends a message 74 to security assertion module 46. Message 74 may include the security assertion request included in redirect 58, and be sent to the alternate hostname specified in redirect 72. Because a tunneling session has not been established, name resolver 40 is configured to resolve the alternate hostname to the public IP address associated with VPN gateway 14. Client device 12 sends message 74, which includes the security assertion request, to security assertion module 46 outside of any tunneling session. That is, network communication module 36 may generate one or more data packets that are not tunneled data packets to transmit message 74. Each of the data packets may include a header portion and a payload portion. The source IP address in the header portion of each packet may be the public IP address associated with client device 12, e.g., an IP address assigned by an ISP that connects client device 12 to public network 18.

In response to receiving message 74 from browser 32, security assertion module 46 may determine that message 60 was not received via a tunneling session because the source IP address included in the header of the packet is a public IP address and/or because the packet is not encapsulated. In response to determining that message 74 was not received via a tunneling session, security assertion module 46 may authenticate the user via one or more messages 76 and 78. For example, security assertion module 46 may send message 76 to browser 32, which may present a web page requesting authentication credentials from the user. After the authentication credentials are received via the web page, browser 32 sends message 78, which includes the authentication credentials, to security assertion module 46. Security assertion module 46 verifies the authentication credentials, and if valid, sends security assertion 80 to browser 32. Because a tunneling session has not been established, security assertion 80 is sent to browser 32 without being tunneled. Browser 32 forwards security assertion 80 to ACS module 44 via message 82. ACS module 44 receives message 82, determines whether the security assertion included in message 82 is valid, and grants or denies the user access to protected resource 22 depending on whether the security assertion is valid. If ACS module 44 grants access to protected resource 22, ACS module 44 may, for example, allow the user to download protected resource 22 via message 84 and/or present a web page in browser 32 that allows the user to view protected resource 22 via message 84.

Security assertion 80, message 82 and message 84 are substantially similar to security assertion 62, message 64 and message 66, respectively described above with respect to FIG. 2. Moreover, message 74 is similar to message 60 described in FIG. 2 except that message 74 is not sent via a tunneling session. Therefore, for the sake of brevity and to avoid redundancy, the content and formulation of message 74, security assertion 80, message 82 and message 84 will not be described in further detail.

As described above with respect to FIG. 3, when a tunneling session is not established, name resolver 40 is configured to resolve the alternate hostname for VPN gateway 14 to a public IP address for VPN gateway 14, which in turn allows message 74 to be successfully delivered in a non-tunneled fashion. By defining an alternate hostname for VPN gateway 14 that resolves to either a public IP address or a private IP address depending on whether a tunneling session has been established, VPN gateway 14 is able use tunneling session detection in order to provide SSO functionality for users who have already established a tunneling session without impairing the ability of users who have not an established tunneling session to also use VPN gateway 14 as an identity provider.

Figure 4:
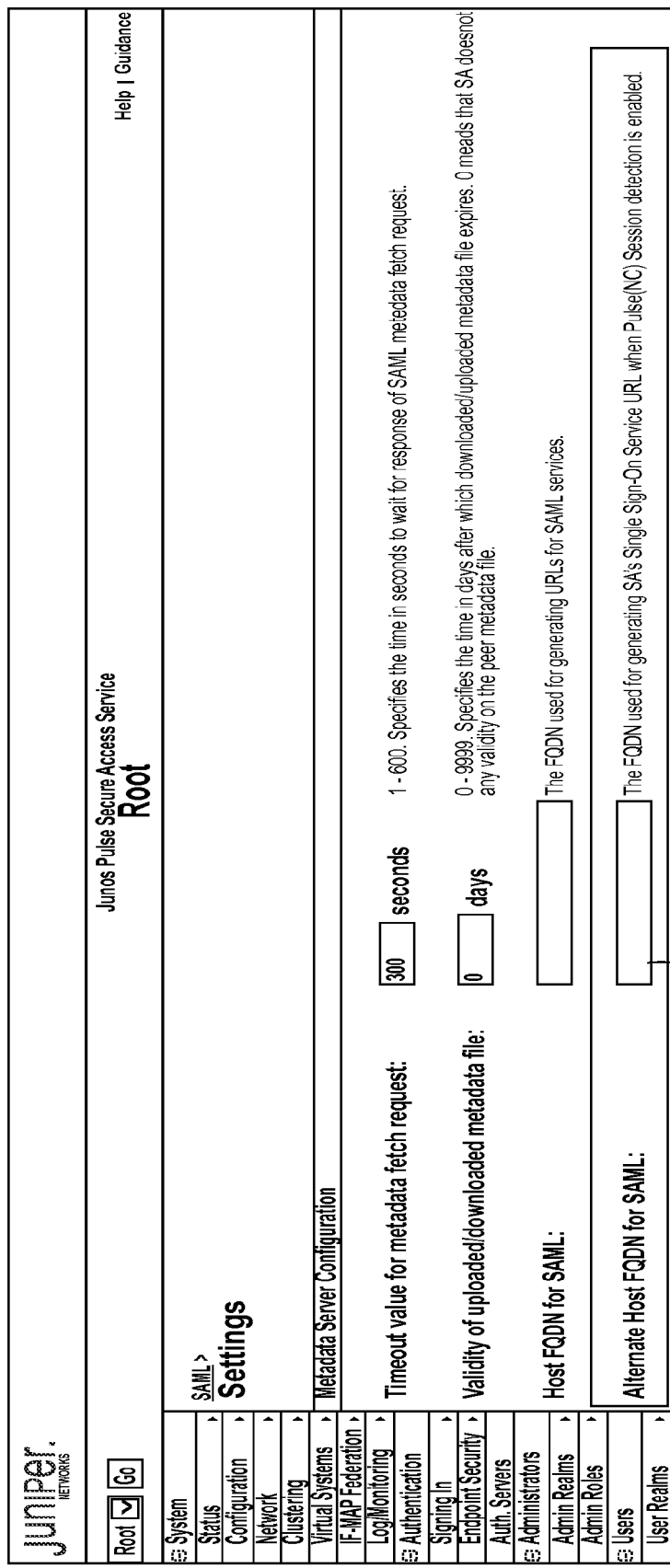
FIG. 4 shows an example user interface that may be used by an administrator to configure a VPN gateway in accordance with the techniques of this disclosure.

FIG. 4 shows an example user interface that may be used by an administrator to configure VPN gateway 14 in accordance with the techniques of this disclosure. As shown in FIG. 4, the user interface includes a text input box 90 that is configured to receive user input that specifies an alternate hostname for VPN gateway 14. The alternate hostname may be resolvable by a client device to either a public IP address associated with VPN gateway 14 or a private IP address associated with VPN gateway 14 depending on whether a tunneling session is established between the client device and VPN gateway 14.

Figure 5:
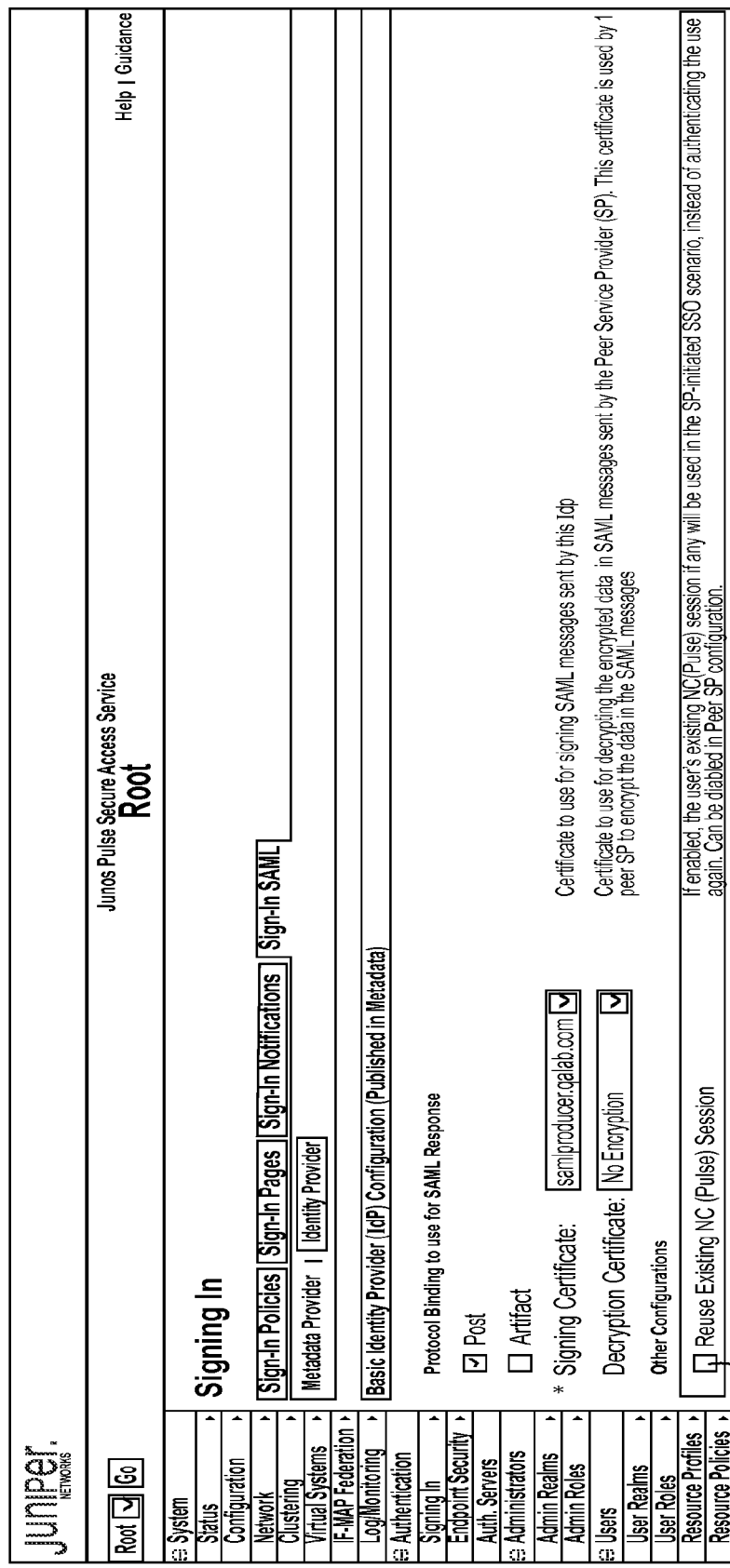
FIG. 5 shows another example user interface that may be used by an administrator to configure a VPN gateway in accordance with the techniques of this disclosure.

FIG. 5 shows another example user interface that may be used by an administrator to configure VPN gateway 14 in accordance with the techniques of this disclosure. As shown in FIG. 5, the user interface includes a checkbox 92, which when checked, enables a tunnel-based SSO security assertion issuance mode for VPN gateway 14. In the tunnel-based SSO security assertion issuance mode, VPN gateway 14 may generate security assertions in response to security assertion requests that are received via a tunneling session without requiring such users to re-authenticate in accordance with the techniques of this disclosure. Thus, the user interface shown in FIG. 5 allows an administrator to selectively enable and disable the tunnel-based SSO security assertion techniques of this disclosure.

Figure 6:
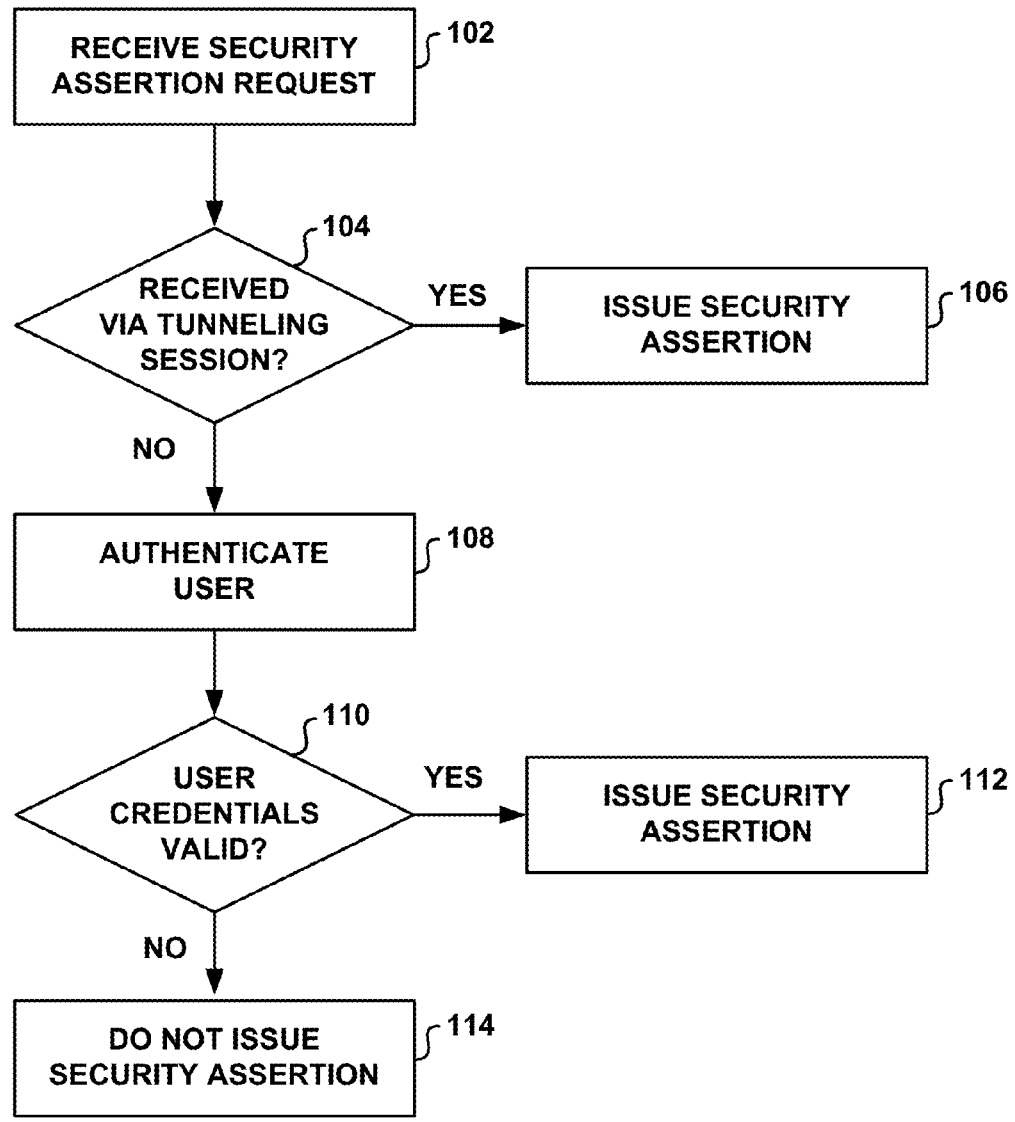
FIG. 6 is a flow diagram illustrating an example technique for issuing security assertions based on whether a security assertion request was received via tunneling session.

FIG. 6 is a flow diagram illustrating an example technique for issuing security assertions based on whether a security assertion request was received via tunneling session. The technique illustrated in FIG. 6 may be implemented, in some examples, in any of the network environments shown in FIGS. 1-3.

Security assertion module 46 of VPN gateway 14 receives a security assertion request (102) from client device 12. The security assertion request may be for a particular user of private network 20 associated with VPN gateway 14. Security assertion module 46 determines whether the security assertion request was received via a tunneling session established for the user between client device 12 and VPN gateway 14 (104). In some examples, security assertion module 46 may determine whether the security assertion request was received via a tunneling session based on a source IP address specified in the security assertion request. In further examples, security assertion module 46 may determine whether the security assertion request was received via a tunneling session based on whether the source IP address specified in the security assertion request is a private IP address associated with private network 20 to which access is controlled by VPN gateway 14.

In some implementations, security assertion module 46 may determine whether the source IP address is a private IP address associated with private network 20 to which access is controlled by VPN gateway 14, and determine that the security assertion request was received via the tunneling session in response to determining that the source IP address is a private IP address associated with private network 20. In additional implementations, security assertion module 46 may also determine whether the private IP address is associated with a valid tunneling session for the user specified in the security assertion request. In such implementations, security assertion module 46 may determine that the security assertion request was received via the tunneling session in response to determining that the source IP address is a private IP address associated with private network 20 and that the private IP address is associated with a valid tunneling session for the user In response to determining that the security assertion request was received via the tunneling session, security assertion module 46 issues a security assertion for the user (106). That is, security assertion module 46 may issue a security assertion without requiring the user to re-authenticate with VPN gateway 14. In some examples, the security assertion may be sent to client device 12 for forwarding to the ACS of service provider 16.

In response to determining that the security assertion request was not received via the tunneling session, security assertion module 46 authenticates the user (108), and determines whether the user credentials are valid (110). If the user credentials are valid, then security assertion module 46 issues a security assertion for the user in a similar manner to process block 106 (112). If the user credentials are not valid, then security assertion module 46 does not issue a security assertion for the user (114). In this manner, VPN gateway 14 may provide SSO functionality to users who request access third-party resources and who have already authenticated with VPN gateway to establish a tunneling session.

Figure 7:
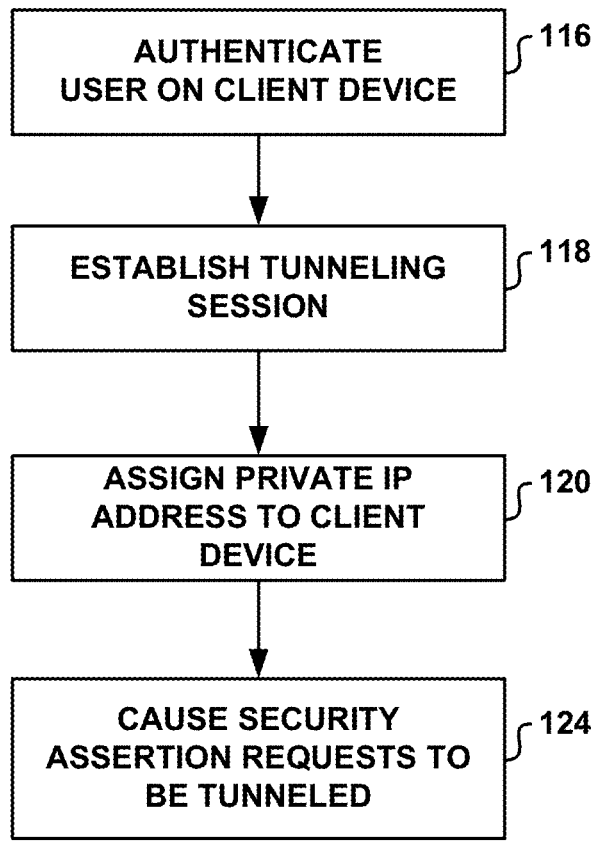
FIG. 7 is a flow diagram illustrating an example technique for causing security assertion requests to be tunneled between a client device and a VPN gateway when a tunneling session has been established.

FIG. 7 is a flow diagram illustrating an example technique for causing security assertion requests to be tunneled between client devices and VPN gateway 14 when a tunneling session has been established. The technique illustrated in FIG. 7 may be implemented, in some examples, in any of the network environments shown in FIGS. 1-3.

Tunnel management module 48 on VPN gateway 14 authenticates a user on client device 12 (116). In some cases, tunnel management module 48 may utilize tunnel client 34 executing on client device 12 to collect authentication credentials from the user. Tunnel management module 48 and tunnel client 34 establish a tunneling session between VPN gateway 14 and client device 12 (118). For example, tunnel management module 48 and tunnel client 34 may negotiate security parameters (e.g., exchange certificates, encryption keys and/or generate security associations) in order to establish the tunneling session. Upon establishment of the tunneling session, tunnel management module 48 may assign a private IP address to client device 12 (120). VPN handler 38 on client device 12 may be configured to use the private IP address assigned by VPN gateway 14 as a source IP address for communications that are tunneled.

Upon establishment of the tunneling session, tunnel management module 48 may cause security assertion requests to be tunneled by client device 12 (124). That is, tunnel management module 48 may cause client device 12 to send security assertion requests to VPN gateway 14 via the established tunneling session. In some example, tunnel management module 48 may cause a hostname for receiving security assertion requests at VPN gateway 14 to be resolved by client device 12 to a private IP address associated with VPN gateway 14 upon establishment of a tunneling session between client device 12 and VPN gateway 14.

In some implementations, prior to establishment of the tunneling session, name resolver 40 in client device 12 may be configured to query a first name server that associates the hostname for receiving security assertions requests with a public IP address associated with VPN gateway 14. In such implementations, in order to cause the hostname for receiving security assertion requests at VPN gateway 14 to be resolved by client device 12 to a private IP address, tunnel management module 48 may be configured to, in some examples, configure name resolver 40 to query a second name server different than the first name server upon establishment of the tunneling session. The second name server may associate the hostname for receiving security assertion requests with the private IP address associated with VPN gateway device 14. In some examples, the first name server may be associated with a name system for public network 18, such as, e.g., a DNS root name server in a publicly accessible DNS system, and the second name server may be associated with a private root name server managed by the organization that manages private network 20.

In additional implementations, in order to cause the hostname for receiving security assertion requests at VPN gateway 14 to be resolved by client device 12 to a private IP address, tunnel management module 48 may be configured to place an entry in a host table of the client device upon establishment of the tunneling session between the client device and the VPN gateway 14. The entry in the host table may associate the hostname for receiving security assertion requests with the private IP address associated with the VPN gateway 14. When resolving hostnames, name resolver 40 may access the entry in the host table prior to querying any name servers in a name system. Thus, the entry in the host table, which associates the hostname for receiving security assertions with a private IP address may effectively override any entries contained in name servers that associate the hostname with a public IP address.

Various embodiments of the invention have been described. These and other embodiments are within the scope of the following claims.

The invention claimed is:

1. A method comprising:
presenting a user interface configured to receive user input specifying whether tunneling session detection should be used to provide security assertions without requiring a user to re-authenticate with a VPN gateway device;
establishing, with the VPN gateway device, a tunneling session for a user of a private network associated with the VPN gateway device, the tunneling session being established between a client device and the VPN gateway device;
receiving, with the VPN gateway device, a security assertion request from the client device, the security assertion request including a request for a security assertion to be made by the VPN gateway device with respect to the user of the private network associated with the VPN gateway device;
determining, with the VPN gateway device, whether the security assertion request was received via the tunneling session established for the user between the client device and the VPN gateway device; and
issuing, with the VPN gateway device, a security assertion for the user in response to determining that the security assertion request was received via the tunneling session.

2. The method of claim 1, wherein issuing the security assertion for the user comprises issuing the security assertion for the user without requiring the user to re-authenticate with the VPN gateway device.

3. The method of claim 1, wherein determining whether the security assertion request was received via the tunneling session comprises:
determining whether the security assertion request was received via the tunneling session based on a source internet protocol (IP) address specified in the security assertion request.

4. The method of claim 1, wherein determining whether the security assertion request was received via the tunneling session comprises:
  determining whether the security assertion request was received via the tunneling session based on whether a source internet protocol (IP) address specified in the security assertion request is a private IP address associated with a private network to which access is controlled by the VPN gateway device.

5. The method of claim 4, wherein determining whether the security assertion request was received via the tunneling session based on whether the source IP address is a private IP address comprises:
  determining whether the source IP address is a private IP address associated with a private network to which access is controlled by the VPN gateway device; and
  determining that the security assertion request was received via the tunneling session in response to determining that the source IP address is a private IP address associated with the private network.

6. The method of claim 4, wherein determining whether the security assertion request was received via the tunneling session based on whether the source IP address is a private IP address comprises:
  determining whether the source IP address is a private IP address associated with a private network to which access is controlled by the VPN gateway device;
  determining whether the private IP address is associated with a valid tunneling session for the user specified in the security assertion request; and
  determining that the security assertion request was received via the tunneling session in response to determining that the source IP address is a private IP address associated with the private network and that the private IP address is associated with a valid tunneling session for the user.

7. The method of claim 1, further comprising:
  causing the client device to send security assertion requests to the VPN gateway device via the tunneling session.

8. The method of claim 7, wherein causing the client device to send security assertion requests to the VPN gateway device via the tunneling session comprises:
  causing a hostname for receiving security assertion requests at the VPN gateway device to be resolved by the client device to a private IP address associated with the VPN gateway device upon establishment of the tunneling session between the client device and the VPN gateway device.

9. The method of claim 8, wherein prior to establishment of the tunneling session, a name resolver in the client device is configured to query a first name server that associates the hostname for receiving security assertions requests with a public IP address associated with the VPN gateway device, and wherein causing the hostname for receiving security assertion requests at the VPN gateway device to be resolved by the client device to a private IP address comprises:
  configuring the name resolver in the client device to query a second name server different than the first name server upon establishment of the tunneling session between the client device and the VPN gateway device, the second name server associating the hostname for receiving security assertion requests with the private IP address associated with the VPN gateway device.

10. The method of claim 8, wherein causing the hostname for receiving security assertion requests at the VPN gateway device to be resolved by the client device to a private IP address comprises:
  placing an entry in a host table of the client device upon establishment of the tunneling session between the client device and the VPN gateway device, the entry associating the hostname for receiving security assertion requests with the private IP address associated with the VPN gateway device.

11. The method of claim 1, wherein the client device includes a VPN handler that is configured to send the security assertion request to the VPN gateway device via the tunneling session when the tunneling session is established.

12. A method for issuing security assertions with a VPN gateway device that is associated with a first hostname, the method comprising:
  presenting a user interface configured to receive user input specifying a second hostname for receiving security assertion requests at the VPN gateway device, the second hostname being different than the first hostnames;
  establishing, with the VPN gateway device, a tunneling session for a user of a private network associated with the VPN gateway device, the tunneling session being established between a client device and the VPN gateway device;
  receiving, with the VPN gateway device, a security assertion request from the client device, the security assertion request including a request for a security assertion to be made by the VPN gateway device with respect to the user of the private network associated with the VPN gateway device;
  determining, with the VPN gateway device, whether the security assertion request was received via the tunneling session established for the user between the client device and the VPN gateway device; and
  issuing, with the VPN gateway device, a security assertion for the user in response to determining that the security assertion request was received via the tunneling session.

13. The method of claim 1, wherein the VPN gateway device is associated with a first hostname, and wherein the method further comprises:
  presenting a user interface configured to receive user input specifying a second hostname for receiving security assertion requests at the VPN gateway device, the second hostname being different than the first hostname.

14. The method of claim 1, wherein the VPN gateway device is a secure sockets layer (SSL) VPN gateway device configured to establish an SSL tunneling session.

15. The method of claim 1, wherein the VPN gateway device is an Internet Protocol Security (IPSec) VPN gateway device configured to establish an IPSec tunneling session.

16. A virtual private network (VPN) gateway device comprising:
  one or more processors configured to:
    present a user interface configured to receive user input specifying whether tunneling session detection should be used to provide security assertions without requiring a user to re-authenticate with a VPN gateway device;
    establish a tunneling session for a user of a private network associated with the VPN gateway device, the tunneling session being established between a client device and the VPN gateway device,
    receive, from the client device, a security assertion request that includes a request for a security assertion to be made by the VPN gateway device with respect to the user of the private network associated with the VPN gateway device, determine whether the security assertion request was received via the tunneling session established for the user between the client device and the VPN gateway device, and issue a security assertion for the user in response to determining that the security assertion request was received via the tunneling session.

17. The device of claim 16, wherein the security assertion module is further configured to issue the security assertion for the user without requiring the user to re-authenticate with the VPN gateway device.

18. The device of claim 16, wherein the security assertion module is further configured to determine whether the security assertion request was received via the tunneling session based on a source internet protocol (IP) address specified in the security assertion request.

19. The device of claim 16, wherein the security assertion module is further configured to determine whether the security assertion request was received via the tunneling session based on whether a source internet protocol (IP) address specified in the security assertion request is a private IP address associated with a private network to which access is controlled by the VPN gateway device.

20. The device of claim 19, wherein the security assertion module is further configured to determine whether the source IP address is a private IP address associated with a private network to which access is controlled by the VPN gateway device, and determine that the security assertion request was received via the tunneling session in response to determining that the source IP address is a private IP address associated with the private network.

21. The device of claim 19, wherein the security assertion module is further configured to determine whether the source IP address is a private IP address associated with a private network to which access is controlled by the VPN gateway device, determine whether the private IP address is associated with a valid tunneling session for the user specified in the security assertion request, and determine that the security assertion request was received via the tunneling session in response to determining that the source IP address is a private IP address associated with the private network and that the private IP address is associated with a valid tunneling session for the user.

22. The device of claim 16, wherein the VPN gateway device further comprises:

a tunnel management module configured to cause the client device to send security assertion requests to the VPN gateway device via the tunneling session.

23. The device of claim 22, wherein the tunnel management module is further configured to cause a hostname for receiving security assertion requests at the VPN gateway device to be resolved by the client device to a private IP address associated with the VPN gateway device upon establishment of the tunneling session between the client device and the VPN gateway device.

24. The device of claim 23, wherein prior to establishment of the tunneling session, a name resolver in the client device is configured to query a first name server that associates the hostname for receiving security assertions requests with a public IP address associated with the VPN gateway device, and wherein the tunnel management module is further configured to configure the name resolver in the client device to query a second name server different than the first name server upon establishment of the tunneling session between the client device and the VPN gateway device, the second name server associating the hostname for receiving security assertion requests with the private IP address associated with the VPN gateway device.

25. The device of claim 23, wherein the tunnel management module is further configured to place an entry in a host table of the client device upon establishment of the tunneling session between the client device and the VPN gateway device, the entry associating the hostname for receiving security assertion requests with the private IP address associated with the VPN gateway device.

26. The device of claim 16, wherein the client device includes a VPN handler that is configured to send the security assertion request to the VPN gateway device via the tunneling session when the tunneling session is established.

27. The device of claim 16, wherein the VPN gateway device is associated with a first hostname, and wherein the VPN gateway device is configured to present a user interface configured to receive user input specifying a second hostname for receiving security assertion requests at the VPN gateway device, the second hostname being different than the first hostname.

28. The device of claim 16, wherein the VPN gateway device is a secure sockets layer (SSL) VPN gateway device configured to establish an SSL tunneling session.

29. The device of claim 16, wherein the VPN gateway device is an Internet Protocol Security (IPSec) VPN gateway device configured to establish an IPSec tunneling session.

30. The method of claim 1, further comprising:

authenticating, with the VPN gateway device, the user in response to determining that the security assertion request was not received via the tunneling session.

31. The device of claim 16, wherein the VPN gateway device is further configured to authenticate the user in response to determining that the security assertion request was not received via the tunneling session.

* * * * *